US 9,459,609 B2

(12) United States Patent
Koizumi et al.

(10) Patent No.: US 9,459,609 B2
(45) Date of Patent: Oct. 4, 2016

(54) ACTUATOR MONITORING CIRCUIT, CONTROLLER, AND ACTUATOR UNIT

(75) Inventors: Takashi Koizumi, Gifu (JP); Hiroshi Usui, Gifu (JP); Kiyoshi Yasuda, Gifu (JP)

(73) Assignee: Nabtesco Corporation, Tokyo (JP)

( * ) Notice: Subject to any disclaimer, the term of this patent is extended or adjusted under 35 U.S.C. 154(b) by 286 days.

(21) Appl. No.: 12/759,352

(22) Filed: Apr. 13, 2010

(65) Prior Publication Data

US 2010/0262320 A1    Oct. 14, 2010

(30) Foreign Application Priority Data

Apr. 14, 2009   (JP) .................................. 2009-097820

(51) Int. Cl.
| | | |
|---|---|---|
| *G06F 7/70* | (2006.01) | |
| *G06F 19/00* | (2011.01) | |
| *G06G 7/00* | (2006.01) | |
| *G06G 7/76* | (2006.01) | |
| *G05B 19/048* | (2006.01) | |
| *G05B 23/02* | (2006.01) | |
| *B64D 45/00* | (2006.01) | |
| *G07C 5/08* | (2006.01) | |

(52) U.S. Cl.
CPC ......... *G05B 19/048* (2013.01); *B64D 45/0005* (2013.01); *G05B 23/0283* (2013.01); *B64D 2045/0085* (2013.01); *G07C 5/085* (2013.01)

(58) Field of Classification Search
CPC ............. F15B 19/005; F04B 2201/02; B64D 2045/0085; B64D 45/0005; G05B 19/048; G05B 23/0283; G05B 23/0235; G05B 9/03

USPC .......... 701/3, 8, 9, 14; 244/75.1, 76 R, 78.1, 244/78.2, 194, 99.2, 99.5, 99.7, 211–213, 244/215, 226
See application file for complete search history.

(56) References Cited

U.S. PATENT DOCUMENTS

| | | | | |
|---|---|---|---|---|
| 4,120,469 A | * | 10/1978 | Westermeier ........ | G05D 1/0077 244/194 |
| 4,129,037 A | * | 12/1978 | Toalson ................ | G01M 15/00 73/114.77 |
| 4,355,358 A | * | 10/1982 | Clelford ............... | G05D 1/0077 244/17.13 |
| 4,551,703 A | * | 11/1985 | Bourauel ................ | B60Q 9/00 340/309.7 |

(Continued)

FOREIGN PATENT DOCUMENTS

| | | |
|---|---|---|
| EP | 1455313 A1 | 9/2004 |
| JP | 03-061704 A | 3/1991 |

(Continued)

OTHER PUBLICATIONS

Office Action issued in corresponding Japanese Application No. 2009-097820 dated Apr. 9, 2013, and English translation thereof (7 pages).

(Continued)

*Primary Examiner* — Khoi Tran
*Assistant Examiner* — Harry Oh
(74) *Attorney, Agent, or Firm* — Osha Liang LLP (57) ABSTRACT

An actuator monitoring circuit 1 which is mounted in an airplane and monitors an actuator 30 having a piston (output portion) calculates the moving distance of the piston, and outputs, when the moving distance exceeds a predetermined threshold, an approaching notification signal 78s and a progression notification signal 79s to notify the excess over the threshold.

7 Claims, 3 Drawing Sheets

(56) References Cited

U.S. PATENT DOCUMENTS

| | | | | |
|---|---|---|---|---|
| 4,918,585 A | * | 4/1990 | Miller et al. | 700/80 |
| 5,233,512 A | * | 8/1993 | Gutz | G05B 9/02 |
| | | | | 318/563 |
| 5,806,805 A | * | 9/1998 | Elbert | B64C 13/42 |
| | | | | 244/195 |
| 5,852,793 A | * | 12/1998 | Board | G01H 1/003 |
| | | | | 702/183 |
| 7,092,848 B2 | * | 8/2006 | Hoff | E02F 9/267 |
| | | | | 700/32 |
| 7,120,523 B2 | * | 10/2006 | Muller | F15B 15/14 |
| | | | | 123/90.12 |
| 7,689,383 B2 | * | 3/2010 | Black | G05B 23/02394 |
| | | | | 702/183 |
| 7,881,880 B2 | * | 2/2011 | Rajamani | G05B 23/0235 |
| | | | | 702/34 |
| 7,891,180 B2 | * | 2/2011 | Le Bastard | 60/406 |
| 7,970,583 B2 | * | 6/2011 | Novis et al. | 702/183 |
| 2003/0131807 A1 | * | 7/2003 | Johns | F01B 3/0032 |
| | | | | 123/43 A |
| 2004/0059504 A1 | * | 3/2004 | Gray | 701/301 |
| 2006/0198737 A1 | * | 9/2006 | Matsui | G05B 9/03 |
| | | | | 417/212 |
| 2007/0164166 A1 | * | 7/2007 | Hirvonen | B64C 13/42 |
| | | | | 244/175 |
| 2007/0164168 A1 | * | 7/2007 | Hirvonen | B64C 13/04 |
| | | | | 244/223 |
| 2007/0233330 A1 | * | 10/2007 | Beutler | G05D 1/0077 |
| | | | | 701/3 |
| 2008/0040152 A1 | | 2/2008 | Vian et al. | |
| 2009/0048689 A1 | * | 2/2009 | Pelton | G05B 23/0235 |
| | | | | 700/33 |
| 2010/0127132 A1 | * | 5/2010 | Kirkland | B64C 13/42 |
| | | | | 244/76 R |
| 2010/0300220 A1 | * | 12/2010 | Vadstrup et al. | 73/865.9 |
| 2011/0006156 A1 | * | 1/2011 | Heeren | F16B 15/223 |
| | | | | 244/99.5 |

FOREIGN PATENT DOCUMENTS

| | | |
|---|---|---|
| JP | 3-129600 | 6/1991 |
| JP | 07-012487 U | 2/1995 |
| JP | 2002-364610 A | 12/2002 |
| JP | 2006-240612 | 9/2006 |
| JP | 2007-517731 A | 7/2007 |
| WO | 02/18879 A1 | 3/2002 |
| WO | 2006/025845 A2 | 3/2006 |

OTHER PUBLICATIONS

English abstract of Japanese Publication No. 2002-364610 published on Dec. 18, 2002, Espacenet database, 1 page.

English abstract of Japanese Publication No. 03-061704 published on Mar. 18, 1991, Espacenet database, 1 page.

Partial translation of p. 22, lines 1-4, of Japanese Publication No. 03-061704 published Mar. 18, 1991 (1 page).

English abstract of Japanese Publication No. 07-012487 published on Feb. 28, 1995, Espacenet database, 1 page.

Partial translation of paragraphs 11 and 14 of Japanese Publication No. 07-012487 published Feb. 28, 1995 (2 pages).

European Search Report in corresponding European Application No. 10159756 dated Mar. 3, 2014 (6 pages).

Michael J. Roemer et al; "Development of Diagnostic and Prognostic Technologies for Aerospace Health Management Applications", IEEE, vol. 6, pp. 3139-3147; Mar. 20, 2001 (9 pages).

* cited by examiner

ACTUATOR MONITORING CIRCUIT, CONTROLLER, AND ACTUATOR UNIT

CROSS REFERENCE TO RELATED APPLICATION

The present application claims priority from provisional applications No. 2009-097820 filed on Apr. 14, 2009, the entire disclosure of which is herein incorporated by reference.

BACKGROUND OF THE INVENTION

1. Field of the Invention

The present invention relates to a monitoring circuit monitoring actuators of an airplane, a controller controlling the operation of the actuators, and an actuator unit.

2. Description of Related Art

Control surfaces and landing gears of airplanes are conventionally operated by using actuators. The operation of actuators may be controlled by electronic control (see Japanese Unexamined Patent Publication No. 240612/2006 (Tokukai 2006-240612; Patent Document 1)).

These actuators may break down. For example, hydraulic actuators may involve fluid leakage from an output portion of the actuator (more specifically, from a piston in a cylinder), and substantially 80 percent of hydraulic actuator break down results from fluid leakage. Such fluid leakage occurs on account of deterioration or breakage of a sealing member in the actuator. In this regard, ground crew visually check the airplane for fluid leakage, either before and after the flight or at predetermined intervals. The actuator is deemed to be broken if the degree of fluid leakage exceeds a predetermined degree. After this judgment, the actuator is repaired or replaced. Such repairing and replacement or preparations for repairing and replacement take time, and hence a delay in the judgment of break down directly lowers on-time performance which is important in airplane operations.

Patent Document 2 (Japanese Unexamined Patent Publication No. 129600/1991 (Tokukaihei 3-129600)) discloses a monitoring apparatus which monitors whether an airplane which is flying is in the normal state. Monitored by this monitoring apparatus are the states of the engines, the state of the gear box, vibration of the airframe, and the like. When a value concerning each state exceeds a predetermined threshold, how long and to what extent the threshold is exceeded are recorded.

Patent Document 3 (the specification of U.S. Patent Publication No. 2008/0040152) recites a technology of monitoring the states of actuators of a flying airplane to collect information. Patent Document 3, however, fails to recite how the states of actuators are specifically monitored.

SUMMARY OF THE INVENTION

The technologies recited in Patent Documents 1-3 do not make it possible to grasp information such as replacement timing of actuators, during the flight of the airplane.

An objective of the present invention is to provide an actuator monitoring circuit, a controller, and an actuator unit, which make it possible to grasp information such as replacement timing of actuators, even during the flight of the airplane.

The first aspect of the invention provides that an actuator monitoring circuit which is mounted in an airplane and monitors an actuator having an output portion (e.g. a piston in a cylinder of a hydraulic linear or rotary actuator or a motor-driven mechanical actuator (EMA)), which calculates the moving distance of the output portion and outputs, when the calculated moving distance exceeds a predetermined threshold, a notification signal to notify the excess over the threshold.

This actuator monitoring circuit outputs, when the moving distance of the actuator exceeds a predetermined threshold, a notification signal notifying the excess over the threshold. This makes it possible to know the replacement timing of the actuator. In addition to the above, since the notification signal is output even when the airplane is flying, it is possible to know the information such as replacement timing of the actuator, even when the airplane is flying.

The second aspect of the invention provides that the controller which is mounted in the airplane and controls a position of the output portion includes the actuator monitoring circuit of the first aspect.

This controller not only carries out the position control of the output portion (e.g. a piston in a cylinder) of the actuator but also notifies the replacement timing of the actuator. Furthermore, the number of components is reduced as compared to cases where the actuator monitoring circuit and an apparatus which controls the position of the output portion are independently provided.

The third aspect of the invention provides that the controller outputs the notification signal to an instrument in a cockpit of the airplane.

This controller allows, by the instrument, the pilots, ground crew, or the like to know the replacement timing of the actuator. Being informed of the information regarding replacement timing or the like during the flight of the airplane, the pilots or the like can pass the information to the airframe manufacturer, airline, or maintenance facility, by wireless communications. During the flight of the airplane, the airline or maintenance facility having received the information prepares the replacement, repair, or checking of the actuator before the airplane lands. This makes it possible to perform replacement or the like immediately after the landing of the airplane, thereby improving the on-time performance of airplanes.

The fourth aspect of the invention provides that the notification signal is directly transmitted to a ground.

This controller allows people on the ground to directly know the replacement timing or the like of the actuator.

The fifth aspect of the invention provides that an actuator unit includes: the actuator; and the controller attached to the actuator.

This actuator unit reduces the space and weight, makes the handling easy, and simplifies the wiring, as compared to cases where the controller is not attached to the actuator.

The sixth aspect of the invention provides that information regarding the actuator is stored in the controller.

This actuator unit makes it possible to grasp the information regarding the actuator in the cockpit or on the ground. The information can also be used for thorough quality management and reliability analysis of the actuator 30 and each component thereof.

As described above, the actuator monitoring circuit in particular is arranged so that the moving distance of the output portion of the actuator is calculated and a notification signal notifying that the moving distance exceeds a predetermined threshold is output, if this is the case. This makes it possible to know the replacement timing of the actuator or the like, even when the airplane is flying.

DESCRIPTION OF THE PREFERRED EMBODIMENTS

The following will describe an embodiment of an actuator monitoring circuit, a controller, and an actuator unit of the present invention with reference to figures.

Figure 1:
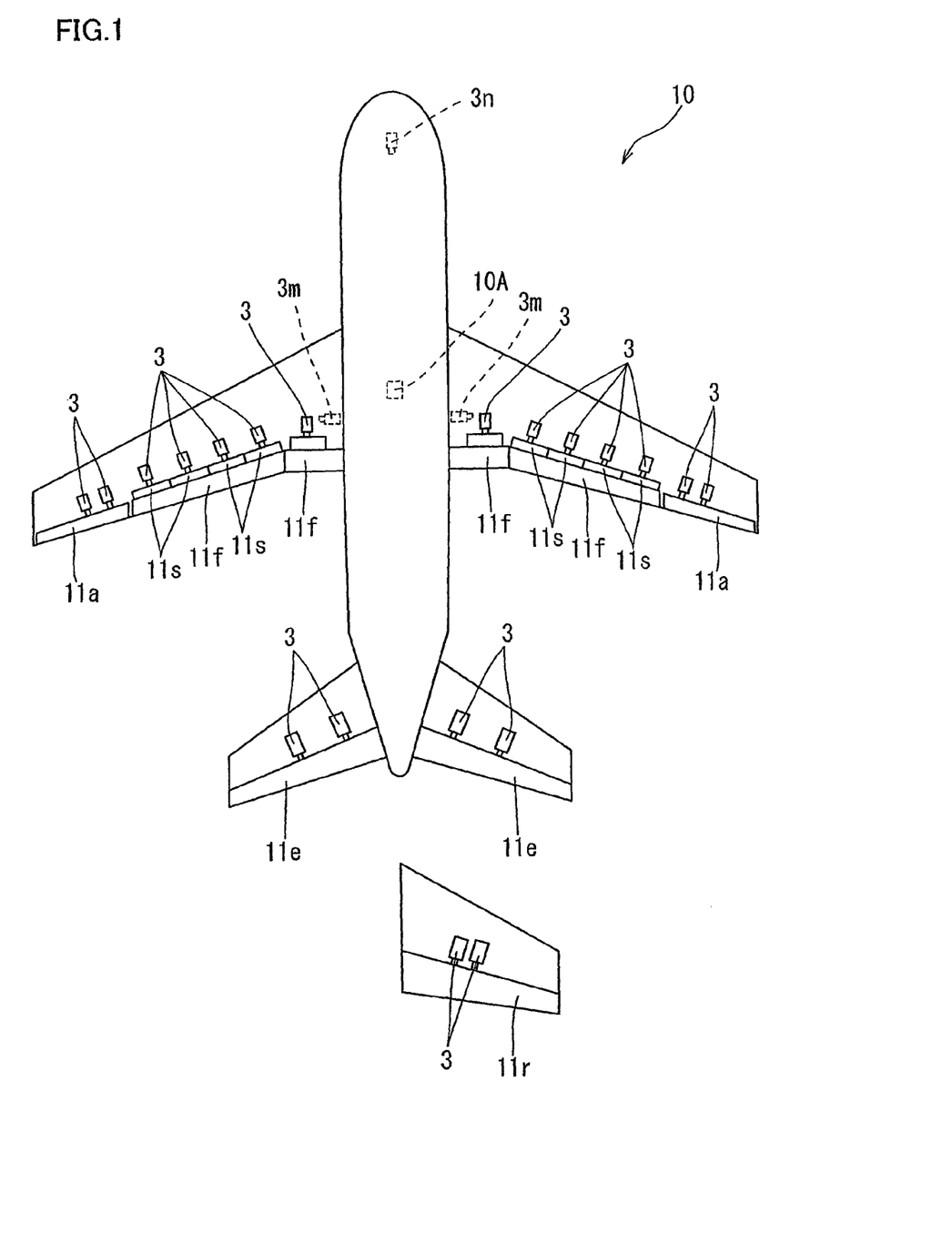
FIG. 1 is a plan view of an airplane.
Figure 2:
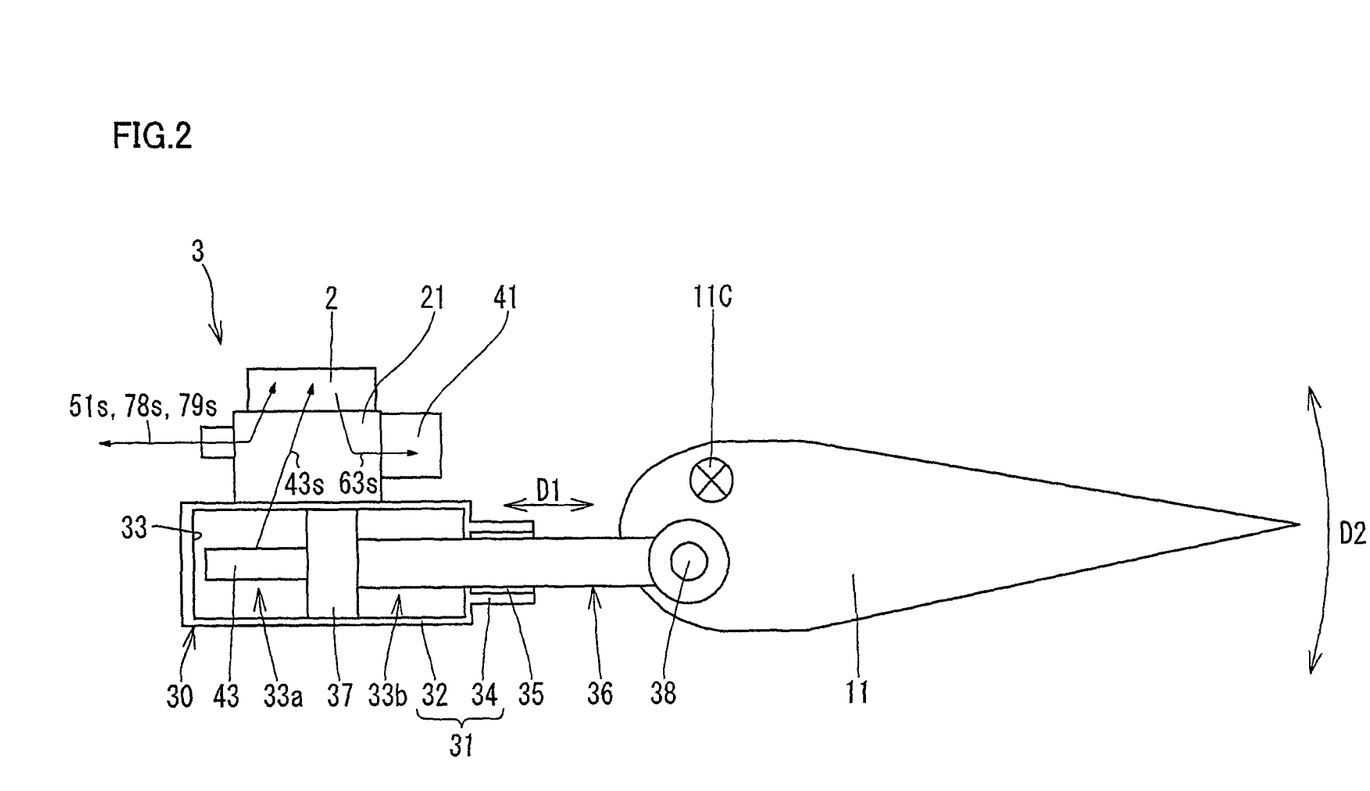
FIG. 2 is a profile of an actuator unit.
Figure 3:
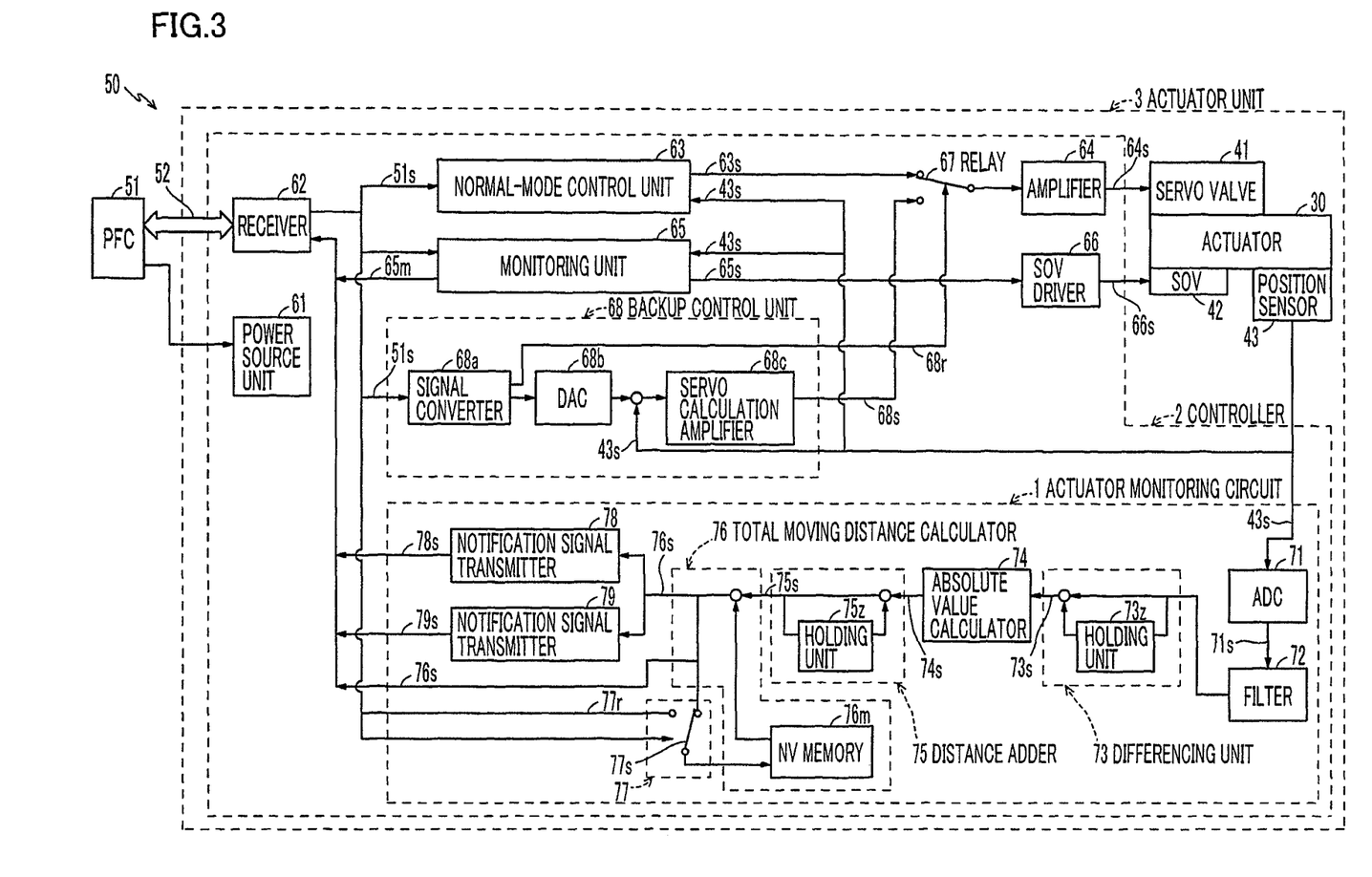
FIG. 3 is a block diagram of a controller.

FIG. 1 is a plan view of an airplane. FIG. 2 is a profile of an actuator provided in the airplane of FIG. 1. FIG. 3 is a block diagram of a controller attached to the actuator unit of FIG. 2. Referring to FIGS. 1-3, the actuator monitoring circuit, the controller, and the actuator unit will be detailed below.

(Actuator Unit)

As shown in FIG. 1 plural actuator units 3 are used for driving control surfaces 11 (see FIG. 2) and landing gears (not illustrated) of the airplane 10. Examples of the control surfaces 11 (see FIG. 2) include elevators 11e for moving up and down the nose, a rudder 11r for horizontally turning the nose, ailerons 11a for horizontally rolling the airplane, spoilers 11s for lessening the lift force generated by the main wings, and flaps 11f for increasing the lift force coefficient. A single control surface 11 (see FIG. 2) is connected to plural actuator units 3. The landing gears (not illustrated) include front wheels and main wheels. The front wheels are connected to an actuator unit 3n whereas the main wheels are connected to the actuator unit 3m.

FIG. 2 shows a single actuator unit 3 connected to a control surface 11, among the actuator units 3 of the airplane 10 (see FIG. 1). This actuator unit 3 includes: a base 21; an actuator 30, a servo valve 41, and a controller 2 which are attached to the base 21; a SOV (Solenoid Valve) 42 (see FIG. 3); and a position sensor 43 housed in the actuator 30.

The actuator 30 drives the control surface 11. This actuator 30 is a hydraulic actuator and includes a cylinder 31 and a piston 36 (output portion).

The cylinder 31 includes a main body 32 and a boss portion 34 protruding from the main body 32.

The main body 32 is arranged so that a cylinder chamber 33 inside the body 32 is filled with hydraulic fluid. The main body 32 is attached to the base 21.

The boss portion 34 supports the piston 36. The inner circumference of the boss portion 34 is covered by a sealing member 35, and this sealing member 35 prevents the hydraulic fluid with which the cylinder chamber 33 is filled from leaking away.

The piston 36 (output portion) moves the control surface 11. In terms of the functions, the piston 36 is divided into one end 37 provided in the main body 32 of the cylinder 31 and the other end 38 directly connected to the control surface 11.

The one end 37 of the piston 36 divides the cylinder chamber 33 into a cylinder chamber 33a (the left part of the cylinder chamber 33 in FIG. 2) and a cylinder chamber 33b (the right part of the cylinder chamber 33). The one end 37 is attached to an unillustrated sealing member (e.g. O-ring). This sealing member seals the gap between the outer circumference of the one end 37 and the inner circumference of the main body 32.

This actuator 30 operates in such a way that hydraulic fluid is supplied to the cylinder chamber 33a and the cylinder chamber 33b so as to move the piston 36 in the axial direction (moving direction D1). As a result, the control surface 11 moves about the center 11C (moving direction D2). As this operation is repeated, the sealing member 35 of the cylinder 31 and the sealing member (not illustrated) on the other end 38 of the piston 36 are deteriorated or broken. From a deteriorated or broken part, hydraulic fluid leaks away. The deterioration and breakage occur after the piston 36 has moved for a predetermined length. This predetermined length is, for example, empirically determined.

The servo valve 41 is a valve for controlling the fluid pressure in the cylinder chamber 33a and the cylinder chamber 33b. This servo valve 41 is an electric hydraulic servo valve which operates in accordance with a control signal 63s from the controller 2.

The SOV 42 (see FIG. 3) is an electromagnetic valve (solenoid valve), and controls the supply of hydraulic fluid to the cylinder chamber 33. More specifically, this SOV 42 (see FIG. 3) is switched so that a pilot switching valve (not illustrated) is switched, and the switching of the pilot switching valve causes a mode switching valve (not illustrated) to be switched. As such, the supply of hydraulic fluid to the cylinder chamber 33 is allowed and stopped. This operation of the SOV 42 (see FIG. 3) varies in accordance with the operation mode of the actuator unit 3 (details will be given later).

The position sensor 43 detects a position of the piston 36 and outputs a position signal 43s to the controller 2. This position sensor 43 is attached, for example, to the inside of the main body 32.

As shown in FIG. 3a, the actuator unit 3 is a part of an actuator control system 50. This actuator control system 50 includes a PFC (Primary Flight Computers) 51 and a data bus 52, in addition to the actuator unit 3.

The PFC 51 is composed of primary flight computers provided for controlling the components of the airplane 10 (see FIG. 1). This PFC 51 exchanges various signals with apparatuses. Output signals from the PFC 51 include an instruction signal 51s for operating the actuator unit 3. The instruction signal 51s is output to the controller 2 via the PFC 51 and the data bus 52. The PFC 51 receives various types of signals such as a monitoring signal 65m of a monitoring unit 65, an approaching notification signal 78s, a progression notification signal 79s, and actuator information of a NV memory (Non-Volatile memory) 76m.

The data bus 52 electrically connects the PFC 51 with the controllers 2 of plural actuator units 3.

(Controller)

As shown in FIG. 2, the controller 2 mainly controls the operation of the actuator 30. This controller 2 is not independent from the actuator 30 but is attached to the actuator 30 (via the base 21). In other words, the controller 2 is termed REU (Remote Electronics Unit).

The operation of this controller 2 is outlined as follows. Firstly, the operation of the actuator 30 is controlled based on the instruction signal 51s supplied from the PFC 51 (see FIG. 3). Furthermore, the total moving distance of the actuator 30 is calculated based on the position signal 43s supplied from the position sensor 43, and the approaching notification signal 78s and the progression notification signal 79s are output when the total moving distance exceeds a predetermined threshold.

In addition to the above, the actuator unit 3 has three operation modes, namely a normal mode, a driven mode, and a backup mode. The operation of the controller 2 is changed in accordance with the operation modes.

The normal mode is set when the actuator unit 3 operates without any problems. In this normal mode, a normal-mode control unit 63 of the controller 2 shown in FIG. 3 operates. This normal-mode control unit 63 outputs a control signal 63s so that the servo valve 41 is operated via a relay 67 and an amplifier 64. Then hydraulic fluid is supplied to the cylinder chamber 33 shown in FIG. 2 so that actuator 30 is operated. The operation of the actuator 30 shown in FIG. 3 is monitored by the monitoring unit 65, and this monitoring unit outputs the monitoring signal 65m to the PFC 51.

The driven mode is set in the following case: among plural actuator units 3 attached to a single control surface 11 shown in FIG. 2, a predetermined number or less actuator units 3 are defective and these defective actuator units 3 are driven by the movement of the control surface 11. In this case, the control surface 11 is moved by a normally-operating actuator unit 3. In this driven mode, the monitoring unit 65 shown in FIG. 3 outputs a driven instruction signal 65s, so that the SOV 42 is operated via a SOV driver 66. Then the supply of the hydraulic fluid to the cylinder chamber 33 shown in FIG. 2 is stopped as described above, to cause the actuator 30 to be driven by the control surface 11.

The backup mode is set when a predetermined number or more of actuator units 3 are defective among plural actuator units 3 attached to a single control surface 11. In this backup mode, the operation of the normal-mode control unit 63 shown in FIG. 3 is backed up by a backup control unit 68. More specifically, the backup control unit 68 outputs a backup control signal 68s, so that the servo valve 41 is operated via the relay 67 and the amplifier 64. The actuator 30 is operated as a result. It is noted that the SOV 42 does not operate in the backup mode (i.e. the actuator 30 is not driven). In any one of the operation modes, the actuator monitoring circuit 1 operates.

The details of the controller 2 will be given. The controller 2 includes a power source unit 61 receiving power from the PFC 51, a receiver 62 for signal input and output between the PFC 51 and the controller 2 via the data bus 52, the normal-mode control unit 63, the amplifier 64, the monitoring unit 65, the SOV driver 66, the relay 67, the backup control unit 68, and the actuator monitoring circuit 1.

The normal-mode control unit 63 controls the actuator 30 when the actuator unit 3 is in the normal mode. This normal-mode control unit 63 operates as follows. First, the instruction signal 51s is input from the PFC 51. Furthermore, the position signal 43s is input from the position sensor 43. Based on the instruction signal 51s and the position signal 43s, the control signal 63s is generated. This control signal 63s is output to the amplifier 64 via the relay 67. The normal-mode control unit 63 is constituted by a DA (Digital-to-Analog) converter and one of a FPGA (Field Programmable Gate Array), an ASIC (Application Specific Integrated Circuit), and a computer.

The amplifier 64 operates as follows. From the normal-mode control unit 63 (or from the backup control unit 68), the control signal 63s (or the backup control signal 68s) is input via the relay 67. The amplified control signal 64s is then output to the servo valve 41.

The monitoring unit 65 monitors the occurrence of abnormalities in the actuator unit 3, and outputs the driven instruction signal 65s to switch the actuator unit 3 to the driven mode when an abnormality has occurred. More specifically, the monitoring unit 65 operates as follows. The position signal 43s is input from the position sensor 43. From other sensors (not illustrated), sensor signals (not illustrated) are input. Furthermore, from the actuator 30, a feedback signal (not illustrated) is input. Based on these input signals, whether an abnormality has occurred in the actuator unit 3 is determined. For example, it is determined that an abnormality has occurred when the normal-mode control unit 63 is broken and the actuator 30 does not perform the normal operation corresponding to the instruction signal 51s. When it is determined that an abnormality has occurred, the driven instruction signal 65s is output to the SOV driver 66. Furthermore, to notify the presence or absence of abnormalities, the monitoring signal 65m is output to the PFC 51 via the receiver 62.

Receiving the driven instruction signal 65s from the monitoring unit 65, the SOV driver 66 outputs the instruction signal 66s to the SOV 42.

The backup control unit 68 operates when the actuator unit 3 is in the backup mode. This backup control unit 68 generates and outputs the backup control signal 68s based on the instruction signal 51s supplied from the PFC 51, and switches the relay 67. More specifically, the backup control unit 68 includes a signal converter 68a, a DAC (Digital-to-Analog) 68b, and a servo calculation amplifier 68c.

The signal converter 68a operates as follows. The instruction signal 51s which is serial data supplied from the PFC 51 via the receiver 62 is converted to parallel data (digital data). This parallel data is output to the DAC 68b. In addition, a relay switch signal 68r is output to the relay 67 so that the relay 67 is switched. As a result of this switching of the relay 67, the backup control unit 68 is connected to the amplifier 64 and the backup control signal 68s is input to the amplifier 64. This signal converter 68a is constituted by either an analog circuit or a PLD (Programmable Logic Device).

The DAC 68b converts a digital signal input from the signal converter 68a into an analog signal and outputs this analog signal to the servo calculation amplifier 68c.

The servo calculation amplifier 68c operates as follows. The analog signal is input from the DAC 68b. Also, the position signal 43s is input from the position sensor 43. Based on the analog signal and the position signal 43s, the backup control signal 68s is generated. This backup control signal 68s is output to the amplifier 64 via the relay 67.

(Actuator Monitoring Circuit)

The actuator monitoring circuit 1 monitors the actuator 30. In other words, this actuator monitoring circuit 1 calculates the moving distance of the piston 36 (see FIG. 2) of the actuator 30, and outputs, when the moving distance exceeds a predetermined threshold, the approaching notification signal 78s and the progression notification signal 79s (notification signals) to notify the excess over the threshold. The actuator monitoring circuit 1 includes an ADC (Analog-to-Digital Converter) 71, a filter 72, a differencing unit 73, an absolute value calculator 74, a distance adder 75, a total moving distance calculator 76, a maintenance circuit 77, a notification signal transmitter 78, and a notification signal transmitter 79.

The ADC 71 is an analog-to-digital converter. This ADC 71 converts an analog position signal 43s input from the position sensor 43 into a digital position signal 71s and outputs the signal to the filter 72 side. The conversions are carried out at sufficiently short intervals so that the moving distance of the piston 36 (see FIG. 2) is accurately calculated even when the piston 36 reciprocates.

The filter 72 removes noise from the position signal 71s which has been input from the ADC 71.

The differencing unit 73 carries out differencing of the position signal 71s. In other words, the differencing unit 73 calculates a positional difference of the piston 36 (see FIG. 2) during a unit time. This differencing unit 73 operates as follows. At a given time, a position signal 71s is input from the filter 72 side. This signal is assumed as a n-th signal. A holding unit 73z holds a (n-1)-th position signal 71s. By calculating a difference between the n-th position signal 71s and the (n-1)-th signal 71s, a difference signal 73s is generated. This difference signal 73s is output to the absolute value calculator 74. The n-th signal is held by the holding unit 73z. The (n+1) position signal 71s is then input to the differencing unit 73, and the operation above is repeated.

The absolute value calculator 74 calculates an absolute value of the difference signal 73s. In other words, the calculator 74 calculates an absolute value of a positional difference of the piston 36 (see FIG. 2) during the unit time. This absolute value calculator 74 calculates an absolute value of the difference signal 73s input from the differencing unit 73, so as to generate an absolute distance signal 74s. This absolute distance signal 74s is output to the distance adder 75.

The distance adder 75 calculates the sum of the moving distances (hereinafter, the sum will be referred to as added distance) of the piston 36 (see FIG. 2) during a predetermined time. This distance adder 75 operates as follows. At a given time, an absolute distance signal 74s is input from the absolute value calculator 74. This absolute distance signal 74s is assumed as a m-th signal. The holding unit 75z holds the sum of the absolute distance signals 74s up to the (m-1)-th signal. The value of the holding unit 75z is arranged to be zero when the power is turned on at the start of the flight. The m-th absolute distance signal 74s is added to the sum of the absolute distance signals 74s up to the (m-1)-th signal, so that the added distance signal 75s of each flight is generated. This added distance signal 75s of each flight is output to the total moving distance calculator 76.

The total moving distance calculator 76 calculates the total moving distance of the piston 36 (see FIG. 2) up to the present time after the replacement of the actuator (hereinafter, this distance will be referred to as total moving distance up to the present time). This total moving distance calculator 76 operates as follows. The distance adder 75 supplies the added distance signal 75s of each flight. The total moving distance calculator 76 includes a NV memory 76m, and this NV memory 76m stores the total moving distance of the piston 36 (see FIG. 2) until the flight of this time (hereinafter, total moving distance until flight). To this value, the value indicated by the added distance signal 75s of each flight is added, so that a total moving length signal 76s is generated to indicate the total moving distance up to the present time. This total moving length signal 76s is output to the notification signal transmitter 78 and the notification signal transmitter 79. Also, the total moving length signal 76s up to the present time is output to the PFC 51 for monitoring the operation of the actuator 30. After the flight, the value of "total moving distance up to the present time" is stored in the NV memory 76m as new "total moving distance until flight".

The NV memory 76m is a non-volatile memory and hence retains information even after the controller 2 is turned off. This NV memory 76m stores "total moving distance until flight" as described above. In addition to this, the memory 76m reads, writes and stores information of the actuators. Examples of the information regarding the actuators, which are stored in the NV memory 76m, include part numbers, manufacturing lot numbers, repair history, information regarding exterior visual tests for checking fluid leakage, and maintenance logs.

The maintenance circuit 77 causes the NV memory 76m to read and write data. This maintenance circuit 77 operates as follows. A maintenance switch 77s is turned on by an instruction from the PFC 51. This connects the NV memory 76m with the PFC 51 via the receiver 62. Then data is read and written as below. For example, when the actuator 30 is replaced, the PFC 51 outputs a reset signal 77r. This results in resetting the "total moving distance until flight" stored in the NV memory 76m. In another example, when only the controller 2 is replaced while the actuator 30 is not replaced, data reading/writing is carried out in the following manner. Before the controller 2 is replaced, actuator information is read out from the NV memory 76m and copied onto an external storage device (not illustrated). After the replacement of the controller 2, the copied actuator information is written into the new NV memory 76m.

The notification signal transmitter 78 and the notification signal transmitter 79 transmit, to the PFC 51, the progression notification signal 79s and the approaching notification signal 78s (notification signals) in accordance with the "total moving distance up to the present time" of the piston 36 (see FIG. 2). These notification signals are output in the following manner.

The progression notification signal 79s is output as follows. When the "total moving distance up to the present time" of the piston 36 (see FIG. 2) exceeds the replacement mileage of the actuator 30 (i.e. the distance with which fluid leakage is expected to exceed a predetermined amount; 20 km for example), the notification signal transmitter 79 outputs the progression notification signal 79s to the PFC 51. In this way, warning is made when the replacement timing of the actuator 30 was reached.

The approaching notification signal 78s is output as follows. When the "total moving distance up to the present time" of the piston 36 (see FIG. 2) exceeds the distance close to the replacement mileage of the actuator 30 (e.g. exceeds a predetermined distance shorter than 20 km), the notification signal transmitter 78 outputs the approaching notification signal 78s to the PFC 51. This reports that the replacement timing of the actuator 30 is approaching.

From the notification signal transmitter 78 and the notification signal transmitter 79, the approaching notification signal 78s and the progression notification signal 79s are output to the PFC 51 and to the instruments (not illustrated) in the cockpit. Also, these signals are directly transmitted to the ground by a wireless communications apparatus (not illustrated). This notifies the pilots, airframe manufacturers, airlines, and ground crew that the replacement timing of the actuator 30 is approaching or was reached.

(Characteristics of Actuator Unit of Present Embodiment)

The actuator unit 3 of the present embodiment has the following characteristics.

The actuator monitoring circuit 1 of the actuator unit 3 outputs the approaching notification signal 78s and the progression notification signal 79s when the moving distance of the piston 36 (see FIG. 2) of the actuator 30 exceeds a predetermined threshold, to notify the excess over the threshold. This makes it possible to understand that the replacement timing of the actuator 30 is approaching or was reached (hereinafter, this will be notified as "information regarding replacement timing"). The approaching notification signal 78s and the progression notification signal 79s are output also when the airplane 10 (see FIG. 1) is flying. This, makes it possible to know information regarding replacement timing of the actuator 30 while the airplane 10 (see FIG. 1) is flying.

The controller 2 of the actuator unit 3 includes the actuator monitoring circuit 1. In other words, the controller 2 is integrated with the actuator monitoring circuit 1. Therefore the controller 2 controls the position of the piston 36 (see FIG. 2) of the actuator 30 as well as carries out the notification of information regarding replacement timing of the actuator 30. Furthermore, the number of components is reduced as compared to cases where the actuator monitoring circuit 1 and the controller 2 are provided as individual components.

In addition to the above, the controller 2 is arranged so as to output the approaching notification signal 78s and the progression notification signal 79s to the unillustrated instruments of the airplane 10 (see FIG. 1). This allows the pilots, ground crew, and the like to grasp the information regarding replacement timing of the actuator 30, by observing the instruments. Being informed of the information regarding replacement timing of the actuator 30 during the flight of the airplane 10, the pilots or the like can pass the information to the airframe manufacturer, airline, or maintenance facility, by wireless communications. During the flight of the airplane 10, the airline or maintenance facility having received the information prepares the replacement, repair, or checking of the actuator 30 before the airplane 10 lands. This makes it possible to replace, repair or check the actuator 30 immediately after the landing of the airplane 10, thereby improving the on-time performance of the airplanes.

In addition to the above, the controller 2 can directly send the approaching notification signal 78s and the progression notification signal 79s to the ground by using a wireless communications apparatus (not illustrated). This allows people on the ground to directly grasp the information regarding replacement timing of the actuator 30 (i.e. without the intermediary of the pilots or the like).

In addition to the above, as shown in FIG. 2, the actuator unit 3 is arranged so that the controller 2 is attached to the actuator 30 (via the base 21) (i.e. the controller 2 and the actuator 30 form a single unit). This reduces the space and weight, makes the handling easy, and simplifies the wiring, as compared to cases where the controller 2 is not attached to the actuator 30 (e.g. in a case where the controller 2 is provided at the location 10A at the middle of the airframe of the airplane 10 shown in FIG. 1).

Furthermore, as shown in FIG. 3, the NV memory 76m of the actuator unit 3 stores the information of the actuator 30 (e.g. part numbers, manufacturing lot numbers, repair history, information regarding exterior visual tests for checking fluid leakage, and maintenance log). This allows people in the cockpit or ground to grasp the information regarding the actuator 30. The information can also be used for thorough quality management and reliability analysis of the actuator 30 and each component thereof.

The embodiment of the present invention has been discussed with reference to the figures. In addition to this, the present invention may be modified as described below.

For example, the embodiment above describes the actuator unit 3 which operates the control surface 11 shown in FIG. 2. In addition to this, the present invention may be adopted in an actuator unit which operates a landing gear (not illustrated). Also, although the embodiment above recites a hydraulic actuator 30, the present invention can be adopted for an actuator driven by an electric motor (EMA (Electro Mechanical Actuator)). Furthermore, although the embodiment above shows a linear-type actuator 30, the present invention can be adopted for a rotary-type actuator. Furthermore, although the moving distance of the piston 36 is calculated by the position sensor 43 in the embodiment above, the present invention can be adopted for an arrangement in which the moving distance of a component different from the piston 36 is calculated, as long as the moving distance of the output portion of the actuator is calculated.

In the embodiment above the controller 2 is attached to the actuator 30 (i.e. the controller 2 is termed REU). Alternatively, the controller 2 may be independent from the actuator 30 in the present invention. For example, the present invention may be arranged so that the controller 2 is provided at around the center of the airframe (location 10A in FIG. 1). (In other words, the controller 2 may be arranged as ACE (Actuator Control Electronics)).

In addition to the above, although the embodiment above is arranged so that the total moving distance of the piston 36 until flight is stored in the NV memory 76m, the present invention may be alternatively arranged so that the NV memory stores the total moving distance of the piston 36 until a day before the flight.

In the embodiment above, the information regarding the actuator 30 is read and written between the PFC 51 and the NV memory 76m. Alternatively, the information may be read and written between an unillustrated read-write terminal and the NV memory 76m. In this case, the information regarding the actuator 30 can be read and written even if the airplane is not provided with the PFC 51.

Furthermore, while the embodiment above is arranged so that notification signals are output when the replacement timing of the actuator 30 is approaching or was reached, notification signals may be output at a different timing. For example, notification signals may be output when the actuator 30 is checked, a component is replaced, or any other type of maintenance is carried out. This makes it possible to grasp when each of various types of maintenances of the actuator 30 should be done.

What is claimed is:

1. An actuator unit mounted in an airplane comprising:
   a controller that is attached to an actuator having an output portion and that controls a position of the output portion of the actuator, wherein the controller comprises:
      a monitoring unit that determines whether abnormality has occurred in an operation of the actuator; and
      an actuator monitoring circuit that monitors the actuator,
   wherein, when the monitoring unit determines that no abnormality has occurred in the operation of the actuator, the actuator monitoring circuit monitors the actuator, and wherein, when the monitoring unit determines that abnormality has occurred in the operation of the actuator, the actuator monitoring circuit monitors the actuator,
   wherein, when a total moving distance of the output portion up to the present time after a replacement of the actuator exceeds a predetermined first threshold, the actuator monitoring circuit outputs a progression notification signal to notify excess over the first threshold, and when the total moving distance of the output portion exceeds a predetermined second threshold, the actuator monitoring circuit outputs an approaching notification signal to notify excess over the second threshold,
   wherein the first threshold is a replacement mileage of the actuator,
   wherein the second threshold is smaller than the first threshold and is set at a predetermined mileage,
   wherein the actuator monitoring circuit comprises:
      a distance adder configured to calculate an added distance, which is the sum of moving distances of the output portion from the activation of power at a stage of flight start to the present time;
      a total moving distance calculator configured to calculate the total moving distance up to the present time by adding the added distance input from the distance adder to a total moving distance until flight, which is a total moving distance of the output portion from the replacement of the actuator to the flight start;
a first notification signal transmitter configured to, when the total moving distance up to the present time input from the total moving distance calculator exceeds the predetermined first threshold, output the progression notification signal; and
a second notification signal transmitter configured to, when the total moving distance up to the present time input from the total moving distance calculator exceeds the predetermined second threshold, output the approaching notification signal,
wherein the total moving distance calculator is configured to output the total moving distance up to the present time to a Primary Flight Computer for monitoring an operation of the actuator,
wherein the total moving distance calculator includes a non-volatile memory that stores the total moving distance until flight, and
wherein, after the flight, the non-volatile memory stores the total moving distance up to the present time as a new total moving distance until flight.

2. The actuator unit according to claim 1, wherein information regarding the actuator is stored in the controller.

3. The actuator unit according to claim 1, wherein:
a plurality of the actuators is provided;
the controller causes an actuator in which abnormality has occurred in the operation according to the monitoring unit to be driven by another actuator in which no abnormality has occurred in the operation according to the monitoring unit; and
the actuator monitoring circuit monitors the operation of the driven actuator.

4. The actuator unit according to claim 1, wherein:
a plurality of actuators are provided;
the controller includes:
a normal-mode control unit that controls an actuator in which no abnormality has occurred in the operation according to the monitoring unit; and
a backup control unit that is provided to be independent from the normal-mode control unit and controls an actuator in which abnormality has occurred in the operation according to the monitoring unit; and
the actuator monitoring circuit monitors the operation of the actuator that is controlled by the backup control unit.

5. The actuator unit according to claim 1, wherein the progression notification signal and the approaching notification signal are output to an instrument in a cockpit of the airplane.

6. The actuator unit according to claim 1, wherein the progression notification signal and the approaching notification signal are directly transmitted to an airline or maintenance facility on the ground.

7. The actuator unit of claim 1, wherein:
the actuator monitoring circuit is attached to the actuator, and
the actuator monitoring circuit and the actuator form a single unit.

* * * * *